United States Patent
Suemitsu et al.

(10) Patent No.: US 9,845,715 B2
(45) Date of Patent: Dec. 19, 2017

(54) MOBILE RECYCLER

(71) Applicant: KOMATSU LTD., Tokyo (JP)

(72) Inventors: Yasukuni Suemitsu, Hirakata (JP);
Takahito Hashino, Hirakata (JP);
Yasutaka Nishida, Hirakata (JP)

(73) Assignee: KOMATSU LTD., Tokyo (JP)

( * ) Notice: Subject to any disclaimer, the term of this patent is extended or adjusted under 35 U.S.C. 154(b) by 52 days.

(21) Appl. No.: 14/650,635

(22) PCT Filed: Jan. 7, 2015

(86) PCT No.: PCT/JP2015/050249
§ 371 (c)(1),
(2) Date: Jun. 9, 2015

(87) PCT Pub. No.: WO2016/110955
PCT Pub. Date: Jul. 14, 2016

(65) Prior Publication Data
US 2016/0341090 A1 Nov. 24, 2016

(51) Int. Cl.
*B01D 53/94* (2006.01)
*F01N 3/20* (2006.01)
*B02C 21/02* (2006.01)
*B60K 13/04* (2006.01)

(52) U.S. Cl.
CPC ........... *F01N 3/2066* (2013.01); *B01D 53/94* (2013.01); *B02C 21/02* (2013.01); *B60K 13/04* (2013.01); *F01N 2590/08* (2013.01); *F01N 2610/02* (2013.01); *F01N 2610/1406* (2013.01); *F01N 2610/1413* (2013.01); *Y02T 10/24* (2013.01)

(58) Field of Classification Search
CPC ....... F01N 3/2066; B60K 13/04; B60K 15/04; B60K 15/05; E02F 9/0883; E02F 9/0891
USPC ......................................................... 180/309
See application file for complete search history.

(56) References Cited

U.S. PATENT DOCUMENTS 5,104,154 A * 4/1992 Shibano .................. F16L 39/06
285/121.6
6,877,610 B2   4/2005 Boast
(Continued)

FOREIGN PATENT DOCUMENTS

JP   H02-283852 A   11/1990
JP   H08-192647 A   7/1996
(Continued)

OTHER PUBLICATIONS

U.S. Appl. No. 14/650,688, filed Jun. 9, 2015, Suemitsu.
(Continued)

*Primary Examiner* — James A Shriver, II
*Assistant Examiner* — Brian L Cassidy
(74) *Attorney, Agent, or Firm* — Drinker Biddle & Reath LLP

(57) ABSTRACT

Such a mobile recycler that an operator can replenish a reducing agent tank with a reducing agent from the ground is provided. A reducing agent tank stores a reducing agent supplied to an exhaust gas treatment device treating an exhaust gas from an engine through reduction reaction. A tank case accommodates the reducing agent tank. The tank case has a support base supporting a container of the reducing agent for replenishment to the reducing agent tank.

6 Claims, 9 Drawing Sheets

(56) References Cited

U.S. PATENT DOCUMENTS

| | | | | |
|---|---|---|---|---|
| 7,544,328 B2* | 6/2009 | Osaku | ................ | B01D 53/9431 |
| | | | | 422/509 |
| 7,618,593 B2* | 11/2009 | Nishina | ................ | F01N 3/2066 |
| | | | | 422/404 |
| 7,758,826 B2* | 7/2010 | Satou | .................... | F01N 3/2066 |
| | | | | 422/106 |
| 7,942,355 B2* | 5/2011 | Yamazaki | ................ | B02C 1/025 |
| | | | | 241/101.2 |
| 8,020,800 B2 | 9/2011 | Potts | | |
| 8,042,753 B2* | 10/2011 | Yamaguchi | ................ | B02C 1/04 |
| | | | | 241/101.74 |
| 8,118,246 B2* | 2/2012 | Yamaguchi | ............. | B02C 25/00 |
| | | | | 241/101.74 |
| 8,434,706 B2 | 5/2013 | Davis | | |
| 8,469,298 B2 | 6/2013 | Robinson et al. | | |
| 8,583,322 B2* | 11/2013 | Yamaguchi | ............ | B02C 21/026 |
| | | | | 144/36 |
| 8,695,827 B2* | 4/2014 | Klauer | .................... | B60K 13/04 |
| | | | | 141/369 |
| 9,027,697 B2* | 5/2015 | Kobayashi | ............ | E02F 9/0875 |
| | | | | 180/296 |
| 9,255,382 B2* | 2/2016 | Noda | ........................ | E02F 9/16 |
| 9,388,725 B2* | 7/2016 | Ogawa | ................. | F01N 3/2066 |
| 2006/0000660 A1* | 1/2006 | Moen | .................... | B62D 25/10 |
| | | | | 180/309 |
| 2008/0168764 A1* | 7/2008 | Recker | .................... | F01N 3/035 |
| | | | | 60/297 |
| 2009/0127265 A1* | 5/2009 | Magnusson | ........... | F01N 3/2066 |
| | | | | 220/564 |
| 2010/0258364 A1* | 10/2010 | Bolz | .................... | B60K 15/063 |
| | | | | 180/9.1 |
| 2015/0016932 A1* | 1/2015 | Azuma | ................ | E02F 9/0833 |
| | | | | 414/687 |
| 2015/0299983 A1* | 10/2015 | Okamoto | ............... | E02F 9/0883 |
| | | | | 180/296 |
| 2015/0337708 A1* | 11/2015 | Schlenke | .............. | F01N 3/2066 |
| | | | | 73/61.59 |
| 2015/0361854 A1* | 12/2015 | Outman | ................ | F01N 3/2066 |
| | | | | 60/303 |
| 2015/0375616 A1* | 12/2015 | Singh | ..................... | B60K 13/04 |
| | | | | 220/23.83 |
| 2016/0040390 A1* | 2/2016 | Ozaki | .................... | E02F 9/0866 |
| | | | | 180/309 |
| 2016/0152131 A1* | 6/2016 | Fujii | ...................... | E02F 9/0883 |
| | | | | 180/309 |
| 2016/0193912 A1* | 7/2016 | Minoura | ................ | B60K 13/04 |
| | | | | 180/309 |
| 2016/0258132 A1* | 9/2016 | Nakano | .................. | B60K 15/03 |
| 2016/0265405 A1* | 9/2016 | Nakano | .................. | E02F 9/0883 |

FOREIGN PATENT DOCUMENTS

| | | |
|---|---|---|
| JP | 2000-324909 A | 11/2000 |
| JP | 2004-174447 A | 6/2004 |
| JP | 2005-112146 A | 4/2005 |
| JP | 2008-215003 A | 9/2008 |
| JP | 2010-248895 A | 11/2010 |
| JP | 2011-064134 A | 3/2011 |
| JP | 2012-091084 A | 5/2012 |
| JP | 5771349 B | 7/2015 |
| WO | WO 2013/137169 A1 | 9/2013 |

OTHER PUBLICATIONS

U.S. Appl. No. 14/650,688, filed Jun. 9, 2015, Suemitsu, et al.

U.S. Office Action dated Aug. 2, 2016 that issued in U.S. Appl. No. 14/650,688.

* cited by examiner

MOBILE RECYCLER

TECHNICAL FIELD

The present invention relates to a mobile recycler.

BACKGROUND ART

In consideration of environmental issues, a mobile recycler which is self-propelled to a site where disposal objects are generated and subjects the disposal objects to disposal at any location at the site for use as a recycled source material has recently been made use of.

An engine and an exhaust gas treatment device for treating an exhaust gas from the engine are mounted on a mobile recycler. As the exhaust gas treatment device, for example, a selective catalytic reduction device (SCR) purifying an exhaust gas by reducing nitrogen oxide in the exhaust gas is available. A reducing agent used for this exhaust treatment is stored in a reducing agent tank.

Japanese Patent Laying-Open No. 2012-91084 (PTD 1) discloses a mobile recycler in which a reducing agent tank is provided upstream of an engine in a flow of cooling wind generated by a cooling fan and the cooling wind which flows toward the engine passes through a space for mounting the reducing agent tank.

CITATION LIST

Patent Document

PTD 1: Japanese Patent Laying-Open No. 2012-91084

SUMMARY OF INVENTION

Technical Problem

A reducing agent is carried manually to a mobile recycler as it is accommodated in a small-capacity container. From a point of view of operability, a reducing agent tank can be replenished with the reducing agent while an operator stands on the ground.

In PTD 1, a tank mount portion on which a reducing agent tank is mounted is provided directly under an engine frame on which an engine is mounted. Since a discharge conveyor transporting a disposed object should be arranged below an engine frame in a mobile recycler, the engine frame is arranged at a high position. Therefore, it is difficult for an operator to replenish the reducing agent tank disclosed in PTD 1 with the reducing agent from the ground.

An object of the present invention is to provide such a mobile recycler that an operator can replenish a reducing agent tank with a reducing agent from the ground.

Solution to Problem

A mobile recycler according to the present invention includes a vehicular body frame, an engine, a pair of traveling apparatuses, an exhaust gas treatment device, a reducing agent tank, and a tank case. The vehicular body frame has a longitudinal direction and a direction of short side in a plan view. The engine is mounted on the vehicular body frame. The traveling apparatus is supported on the vehicular body frame at each of opposing end portions in the direction of short side of the vehicular body frame. The traveling apparatus extends along the longitudinal direction of the vehicular body frame. The exhaust gas treatment device treats an exhaust gas from the engine through reduction reaction. The reducing agent tank stores a reducing agent supplied to the exhaust gas treatment device. The tank case accommodates the reducing agent tank. The tank case is attached to the vehicular body frame. The tank case is superimposed on one of the pair of traveling apparatuses when viewed in the longitudinal direction. The tank case has a support base supporting a container of a reducing agent for replenishment to the reducing agent tank.

A reducing agent and a precursor of the reducing agent are herein collectively referred to as a "reducing agent".

In the mobile recycler, a position of the support base can be changed between a storage position in which the support base is stored in the tank case and a support position in which the support base supports the container.

In the mobile recycler, the support base has a pivotable plate member on which the container is carried in the support position and a stay supporting the plate member.

In the mobile recycler, the plate member forms a part of an outer surface of the tank case.

In the mobile recycler, the stay is coupled to the plate member in a central portion of the plate member in a fore/aft direction.

In the mobile recycler, the tank case has a front plate member forming a front surface of the tank case and a bottom plate member forming a bottom surface of the tank case. The front plate member is greater in thickness than the bottom plate member.

Advantageous Effects of Invention

According to the present invention, since a reducing agent tank can be replenished with a reducing agent while a container for the reducing agent is supported on the support base, replenishment of the reducing agent tank with the reducing agent while an operator stands on the ground is facilitated.

DESCRIPTION OF EMBODIMENTS

An embodiment of the present invention will be described hereinafter with reference to the drawings.

Initially, a structure of a mobile recycler in one embodiment of the present invention will be described. A mobile crusher representing one example of the mobile recycler to which the concept according to the present invention is applicable will be described hereinafter, however, the present invention is applicable to any mobile recycler such as a mobile wood grinder and a mobile soil recycler.

Figure 1:
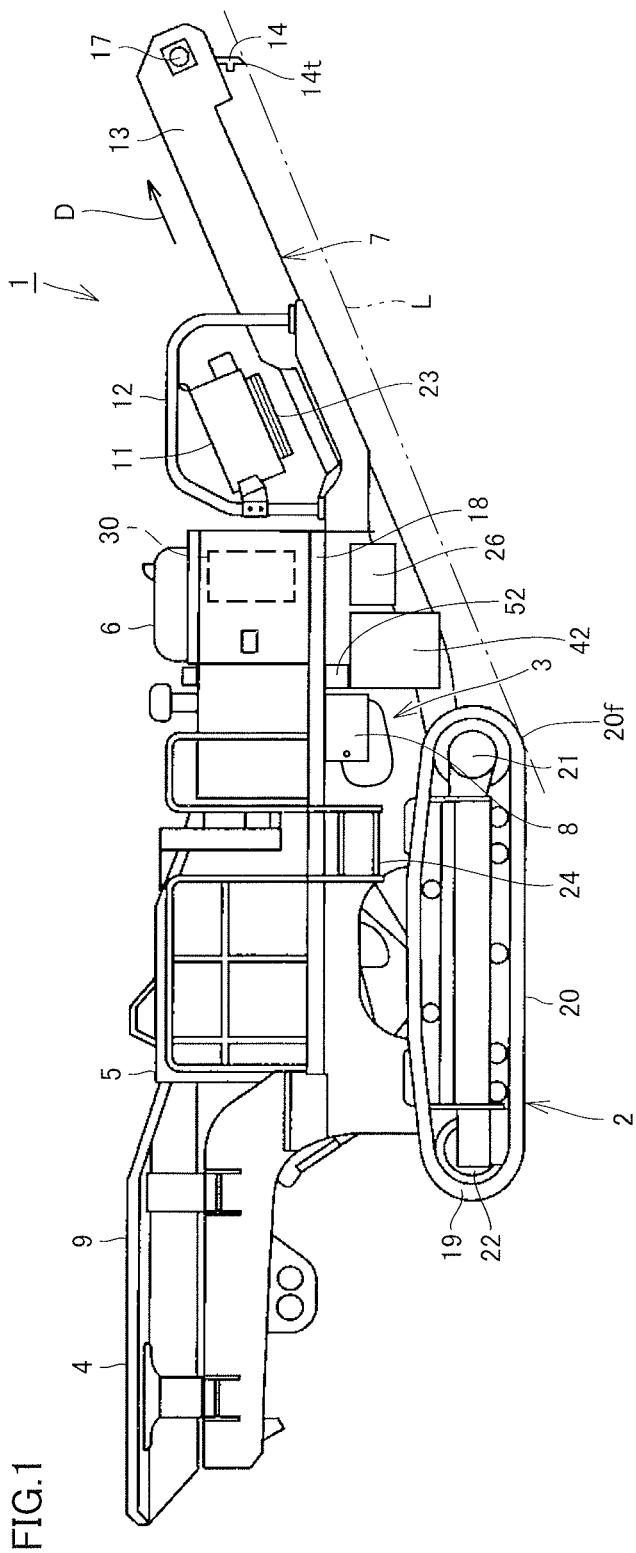
FIG. 1 is a side view of a mobile crusher according to one embodiment of the present invention.
Figure 2:
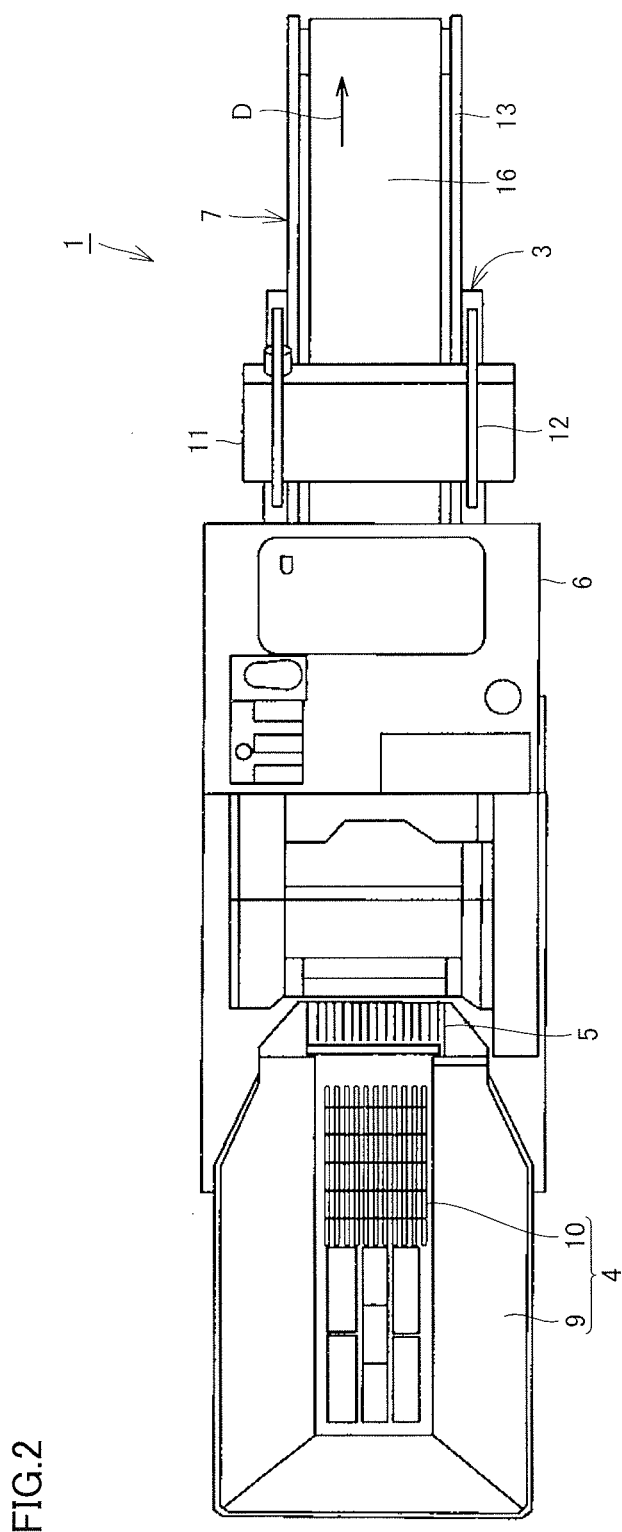
FIG. 2 is a plan view of the mobile crusher according to one embodiment of the present invention.

FIG. 1 is a side view of a mobile crusher 1 according to one embodiment of the present invention. FIG. 2 is a plan view of mobile crusher 1 according to one embodiment of the present invention. Mobile crusher 1 shown in FIGS. 1 and 2 is an apparatus suitably used for generating highly recyclable or transportable, small crushed objects, by coarsely crushing crush objects such as construction debris such as concrete debris, industrial wastes, or natural stones at a construction site into a prescribed particle size.

As shown in FIGS. 1 and 2, mobile crusher 1 mainly includes a carrier 2, a vehicular body frame, a crush object feeding apparatus 4, a crushing apparatus 5, an engine compartment 6, and a discharge conveyor 7. In the following, a right side in FIGS. 1 and 2 is defined as the front of mobile crusher 1 and a left side is defined as the rear of mobile crusher 1. Crush object feeding apparatus 4 is arranged on a rear side of mobile crusher 1. Discharge conveyor 7 is arranged on a front side of mobile crusher 1.

Carrier 2 has a drive wheel 21, a driven wheel 22, and a crawler belt 19. Carrier 2 is constructed such that crawler belt 19 is wound around front drive wheel 21 and rear driven wheel 22. As crawler belt 19 is wound around drive wheel 21 and driven wheel 22, a crawler belt type travel apparatus is constructed. With rotational drive of drive wheel 21, crawler belt 19 rotates so that mobile crusher 1 can self-propel itself. As shown in FIG. 1, crawler belt 19 has a ground engaging surface 20 coming in contact with the ground.

The vehicular body frame has a main body frame 3 and an engine frame 18. As shown in FIG. 2, the vehicular body frame has a longitudinal direction and a direction of short side in a plan view. The longitudinal direction of the vehicular body frame matches with a fore/aft direction of mobile crusher 1. The direction of short side of the vehicular body frame matches with a lateral direction of mobile crusher 1.

Carrier 2 is supported by main body frame 3. Carrier 2 is provided below main body frame 3. Main body frame 3 extends in the fore/aft direction of mobile crusher 1. Carrier 2 extends along the longitudinal direction of the vehicular body frame.

On the left and right of mobile crusher 1, a pair of side plates 3a of main body frames 3 is arranged. Carrier 2 is provided on each of the left and right of main body frame 3. Carrier 2 is supported by the vehicular body frame at each of opposing end portions in the direction of short side of the vehicular body frame. Carrier 2 has drive wheels 21 on a front side in a side portion of main body frame 3 and driven wheels 22 on a rear side in the side portion. Carrier 2 is constructed such that loop-shaped crawler belt 19 is wound around drive wheel 21 and driven wheel 22. Mobile crusher 1 includes a pair of left and right carriers 2. Main body frame 3 is attached below engine frame 18.

Engine compartment 6 is provided on engine frame 18. Engine compartment 6 is placed on a front side of engine frame 18. Engine compartment 6 is formed to separate an internal space therein and the outside from each other with an exterior cover being interposed. The internal space in engine compartment 6 accommodates a hydraulic pump, an engine 30, and an exhaust gas treatment device. The hydraulic pump transfers a hydraulic oil supplied to each hydraulic actuator for operating mobile crusher 1. Engine 30 generates driving force for driving the hydraulic pump. Engine 30 serves as a motive power source of mobile crusher 1. The exhaust gas treatment device treats an exhaust gas from engine 30.

Engine 30 is mounted on engine frame 18. A fuel tank, a hydraulic oil tank, and a main valve are mounted on engine frame 18. The fuel tank stores a fuel to be supplied to engine 30. The hydraulic oil tank stores a hydraulic oil to be supplied to a hydraulic actuator. The main valve allows feed and discharge to and from the hydraulic actuator, of the hydraulic oil suctioned from the hydraulic oil tank and transferred by the hydraulic pump.

Crush object feeding apparatus 4 and crushing apparatus 5 are mounted on main body frame 3. Crush object feeding apparatus 4 is placed on a rear side of main body frame 3. Crushing apparatus 5 is placed in a central portion of main body frame 3 and placed between crush object feeding apparatus 4 and engine compartment 6 in the fore/aft direction.

Crush object feeding apparatus 4 is constituted of a hopper 9 into which crush objects are dropped and a feeder 10 transporting the crush objects in hopper 9 toward crushing apparatus 5. Hopper 9 is provided to accept crush objects and has a shape increasing in width upward. Feeder 10 is provided below hopper 9 and transports crush objects which have been accepted by hopper 9 toward crushing apparatus 5.

Crushing apparatus 5 is an apparatus for crushing crush objects which have been dropped into hopper 9, and is one of work implements of mobile crusher 1. Crushing apparatus 5 is located in front of and below hopper 9 and mounted around the center in a longitudinal direction of main body frame 3. Crushing apparatus 5 is exemplified by a jaw crusher in which a crushing chamber is formed by a fixed jaw and a moving jaw moving relative to the fixed jaw and crush objects which have been introduced into the crushing chamber are crushed between the fixed jaw and the moving jaw and discharged from a discharge opening below.

Discharge conveyor 7 is an apparatus transporting disposed objects resulting from crushing by crushing apparatus 5 and discharged from crushing apparatus 5 toward the front of mobile crusher 1. Discharge conveyor 7 is assembled into main body frame 3, below engine frame 18. Discharge conveyor 7 is provided between the pair of carriers 2, below engine frame 18. Discharge conveyor 7 is formed to extend from a lower position in crushing apparatus 5 under engine compartment 6, to extend further forward, and to rise in an oblique direction to a height as high as an upper end portion of hopper 9 and engine compartment 6.

Discharge conveyor 7 has a pair of conveyor frames 13 extending in the fore/aft direction, a conveyor belt 16 provided between conveyor frames 13, and a conveyor belt drive portion 17 driving conveyor belt 16. A drive pulley and a driven pulley are provided at a front end portion and a rear end portion of conveyor frame 13 and conveyor belt 16 is wound around these drive pulley and driven pulley.

Conveyor belt 16 carries out circulating motion as it is driven by conveyor belt drive portion 17. Discharge conveyor 7 is constructed to be able to transport disposed objects dropped from crushing apparatus 5 onto conveyor belt 16 toward the front of mobile crusher 1 as conveyor belt 16 carries out circulating motion. An arrow in FIGS. 1 and 2 shows a direction in which conveyor belt 16 runs, which is a direction of movement D of disposed objects transported by conveyor belt 16.

Discharge conveyor 7 has a scraper 14. Scraper 14 is fixed to conveyor frame 13 and comes in contact with a surface of conveyor belt 16. As conveyor belt 16 carries out circulating motion while it is in contact with scraper 14, adherents such as soil which have adhered to the surface of conveyor belt 16 are scraped off by scraper 14. Deposition of adherents to the surface of conveyor belt 16 is thus suppressed.

Scraper 14 protrudes downward from conveyor frame 13. A tip end portion 14t of scraper 14 forms a portion of discharge conveyor 7, which protrudes most on a side of the ground, with respect to direction of movement D of disposed objects. Crawler belt 19 has ground engaging surface 20 and ground engaging surface 20 has a foremost front end 20f. A chain double dotted line L in FIG. 1 shows a straight line passing through tip end portion 14t of scraper 14 and front end 20f of ground engaging surface 20 in a side view.

In front of engine compartment 6, a magnetic separator 11 is arranged above discharge conveyor 7. A magnetic separator support frame 12 is fixed at a front end of main body frame 3, and magnetic separator 11 is supported as being suspended from magnetic separator support frame 12. Magnetic separator 11 has a magnetic separator belt 23. As magnetic force is applied through magnetic separator belt 23, rod-shaped magnetic elements such as re-bar, nails, and wires are screened so that the magnetic elements are removed from disposed objects which move over conveyor belt 16.

A maintenance ladder 24 for an operator to access engine frame 18 is provided above carrier 2 in a side surface portion around the center in the fore/aft direction of mobile crusher 1. Maintenance ladder 24 is fixed to engine frame 18. Maintenance ladder 24 is arranged in front of crushing apparatus 5 and in the rear of engine compartment 6. An operator can reach a space formed between crushing apparatus 5 and engine compartment 6 via maintenance ladder 24. The operator can perform a maintenance operation of such apparatuses as crushing apparatus 5 and engine 30 and the like accommodated in engine compartment 6 in that space.

Figure 3:
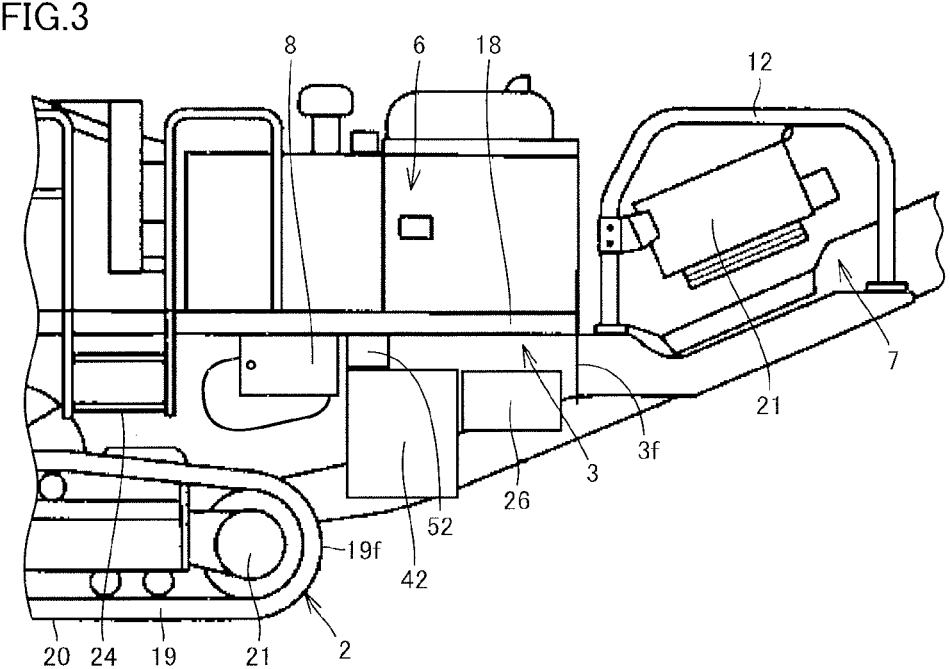
FIG. 3 is an enlarged view around a reducing agent tank included in the mobile crusher shown in FIG. 1.

FIG. 3 is an enlarged view around the reducing agent tank included in mobile crusher 1 shown in FIG. 1. As shown in FIGS. 1 and 3, a control panel 8 for operating mobile crusher 1 is provided above a front end 19f of crawler belt 19 and below engine frame 18. Control panel 8 has measuring instruments for monitoring mobile crusher 1 and various operation devices for operating feeder 10, crushing apparatus 5, and discharge conveyor 7 and the like.

A tank case 42 is provided at a position adjacent to a front side of control panel 8. Tank case 42 is formed of a metal material such as a steel material. An internal space in tank case 42 accommodates the reducing agent tank storing the reducing agent. Tank case 42 has a tank accommodation space formed therein, for accommodating the reducing agent tank. Tank case 42 separates the tank accommodation space and the outside thereof from each other. The internal space in engine compartment 6 accommodating engine 30 and the tank accommodation space in tank case 42 are formed as spaces separate from each other and formed not to communicate with each other.

Tank case 42 and the reducing agent tank accommodated in tank case 42 are arranged in front of front end 19f of crawler belt 19 in the fore/aft direction (in the lateral direction in FIGS. 1 and 3) of mobile crusher 1. The reducing agent tank is arranged at a position adjacent to front end 19f of crawler belt 19. Tank case 42 and the reducing agent tank are arranged in the rear of front end 3f (FIG. 3) of main body frame 3 in the fore/aft direction. Tank case 42 and the reducing agent tank are arranged below engine frame 18 in the vertical direction.

A pump case 52 is provided under engine frame 18 and above tank case 42. Pump case 52 is arranged at a position adjacent to the front side of control panel 8. An internal space in pump case 52 accommodates a reducing agent pump transferring the reducing agent. Since the entire pump case 52 is arranged between engine frame 18 and tank case 42, the reducing agent pump accommodated in pump case 52 is arranged between engine frame 18 and the reducing agent tank in the vertical direction. As tank case 42 and the reducing agent tank are arranged with the reducing agent pump being interposed between them and engine frame 18, they are arranged below engine frame 18 at a distance therefrom.

A tool box 26 is provided at a position adjacent to a front side of tank case 42. Tool box 26 accommodates various tools for maintenance and repair of mobile crusher 1. Tool box 26 is arranged in front of tank case 42 and in the rear of front end 3f of main body frame 3 in the fore/aft direction. Tool box 26 is arranged between front end 3f of main body frame 3 and tank case 42.

In the side views shown in FIGS. 1 and 3, tank case 42 and the reducing agent tank are arranged on the right of control panel 8 and on the left of tool box 26. As tank case 42 and the reducing agent tank are arranged with tool box 26 being interposed between them and front end 3f of main body frame 3, they are arranged in the rear of front end 3f of main body frame 3 at a distance therefrom.

Figure 4:
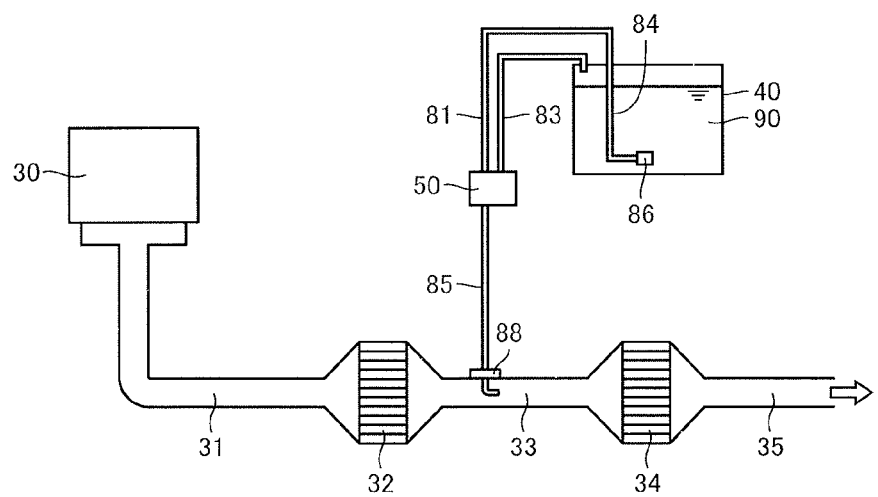
FIG. 4 is a functional diagram schematically showing a path for a reducing agent and a path for exhausting an exhaust gas from an engine.

FIG. 4 is a functional diagram schematically showing a path for the reducing agent and a path for exhausting the exhaust gas from engine 30. Mobile crusher 1 includes an exhaust gas treatment unit for treating and purifying an exhaust gas emitted from engine 30. The exhaust gas treatment unit mainly includes exhaust gas treatment devices 32 and 34, an intermediate connection pipe 33, an exhaust stack 35, and an injection nozzle 88 for a reducing agent.

Exhaust gas treatment device 32 is connected to engine 30 through an exhaust pipe 31. Exhaust gas treatment device 34 is connected to exhaust gas treatment device 32 through intermediate connection pipe 33. The exhaust gas emitted from engine 30 is emitted from exhaust stack 35 into atmosphere after it successively passed through exhaust pipe 31, exhaust gas treatment device 32, intermediate connection pipe 33, and exhaust gas treatment device 34. In the flow of emission of the exhaust gas from engine 30, exhaust gas treatment device 32 is arranged downstream of engine 30 and exhaust gas treatment device 34 is arranged downstream of exhaust gas treatment device 32.

Exhaust gas treatment device 32 oxidizes an unburned gas such as carbon monoxide and hydrocarbon contained in the exhaust gas emitted from engine 30 so as to lower a concentration of the unburned gas in the exhaust gas. Exhaust gas treatment device 32 is implemented, for example, by a diesel oxidation catalyst device.

Exhaust gas treatment device 34 reduces nitrogen oxide contained in the exhaust gas through reaction with a reducing agent and chemically changes the nitrogen oxide to a harmless nitrogen gas, to thereby lower a concentration of the nitrogen oxide in the exhaust gas. Exhaust gas treatment device 34 is implemented, for example, by a $NO_x$ removal device of a selective catalytic reduction type. Intermediate connection pipe 33 on the upstream side of exhaust gas treatment device 34 in the flow of the exhaust gas is provided with injection nozzle 88 for injecting a reducing agent into intermediate connection pipe 33. Intermediate connection pipe 33 has a function as a mixing pipe for injecting and mixing the reducing agent into the exhaust gas.

A reducing agent tank 40 is accommodated in tank case 42 shown in FIGS. 1 and 3. A reducing agent 90 is stored in reducing agent tank 40. Reducing agent tank 40 storing the reducing agent therein is integrally formed of a resin material excellent in corrosion resistance such as polyethylene. A reducing agent pump 50 is accommodated in pump case 52 shown in FIGS. 1 and 3.

A suction pipe 84 in which reducing agent 90 which flows out of reducing agent tank 40 flows is arranged in reducing agent tank 40. A strainer (a filter) 86 is connected to a tip end of suction pipe 84.

Reducing agent tank 40 and reducing agent pump 50 are coupled to each other through a supply pipe 81 and a return pipe 83. Supply pipe 81 is a pipe for sending the reducing agent from reducing agent tank 40 to reducing agent pump 50. Suction pipe 84 is coupled to supply pipe 81. Return pipe 83 is a pipe for returning the reducing agent from reducing agent pump 50 to reducing agent tank 40.

Reducing agent pump 50 and injection nozzle 88 are coupled to each other through a delivery pipe 85. Delivery pipe 85 is a pipe for transferring the reducing agent from reducing agent pump 50 to injection nozzle 88.

Reducing agent 90 suctioned from reducing agent tank 40 is transferred by reducing agent pump 50 and reaches injection nozzle 88 successively through supply pipe 81 and delivery pipe 85. Reducing agent 90 is injected into the exhaust gas which flows through intermediate connection pipe 33, through injection nozzle 88 attached to intermediate connection pipe 33. An amount of the reducing agent injected into the exhaust gas is controlled based on a temperature of the exhaust gas which passes through exhaust gas treatment device 34 and a concentration of nitrogen oxide in the exhaust gas. Reducing agent 90 not used for exhaust gas treatment is returned to reducing agent tank 40 from reducing agent pump 50 through return pipe 83.

The reducing agent transferred from reducing agent tank 40 through supply pipe 81 to reducing agent pump 50 is branched into two in reducing agent pump 50. The reducing agent not used for exhaust gas treatment is returned from reducing agent pump 50 through return pipe 83 to reducing agent tank 40. The reducing agent used for exhaust gas treatment reaches injection nozzle 88 from reducing agent pump 50 through delivery pipe 85 and is sprayed from injection nozzle 88 into intermediate connection pipe 33.

Injection nozzle 88 has a function as a reducing agent injector for injecting reducing agent 90 suctioned from reducing agent tank 40 to the upstream side of the exhaust gas relative to exhaust gas treatment device 34. Injection nozzle 88 supplies reducing agent 90 into the exhaust gas which flows through intermediate connection pipe 33. A concentration of nitrogen oxide in the exhaust gas lowers as a result of reaction of the nitrogen oxide contained in the exhaust gas with reducing agent 90 in exhaust gas treatment device 34. In a case that a urea solution is employed as reducing agent 90, the urea solution is decomposed in intermediate connection pipe 33 and converted to ammonia, so that the nitrogen oxide is decomposed to harmless nitrogen and oxygen as a result of reaction between the nitrogen oxide and ammonia. An exhaust gas of which amount of nitrogen oxide has lowered to an appropriate value is emitted through exhaust stack 35.

Figure 5:
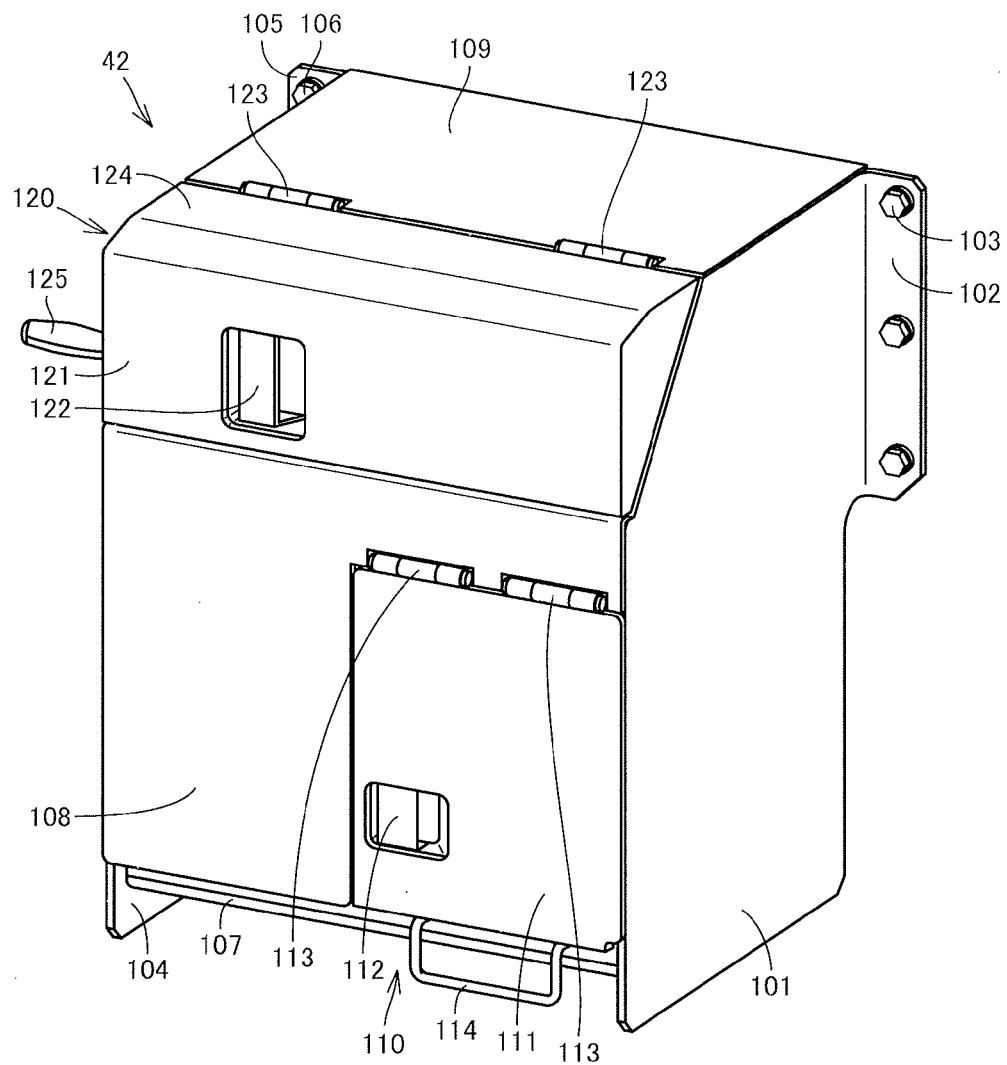
FIG. 5 is a perspective view of a tank case.

FIG. 5 is a perspective view of tank case 42. Tank case 42 has a front plate member 101, a rear plate member 104, a bottom plate member 107, a side plate member 108, and a top plate member 109. A fore/aft direction of tank case 42 matches with the fore/aft direction of mobile crusher 1 with tank case 42 being attached to mobile crusher 1. Front plate member 101 forms a front surface of tank case 42. Rear plate member 104 forms a rear surface of tank case 42.

Front plate member 101 has a flat plate shape. A fixation portion 102 fixing tank case 42 to main body frame 3 is joined to front plate member 101. Fixation portion 102 may be formed by bending a part of a plate material forming front plate member 101. A plurality of through holes penetrating strip-shaped fixation portion 102 in a direction of thickness are formed, and by fastening bolts 103 through these through holes and through holes formed in main body frame 3, front plate member 101 is fixed to main body frame 3.

Rear plate member 104 has a flat plate shape. A fixation portion 105 fixing tank case 42 to main body frame 3 is joined to rear plate member 104. Fixation portion 105 may be formed by bending a part of a plate material forming rear plate member 104. A plurality of through holes penetrating strip-shaped fixation portion 105 in a direction of thickness are formed, and by fastening bolts 106 through these through holes and through holes formed in main body frame 3, rear plate member 104 is fixed to main body frame 3.

Bottom plate member 107 forms a bottom surface of tank case 42. Side plate member 108 forms a side surface of tank case 42. Top plate member 109 forms a top surface of tank case 42. Bottom plate member 107, side plate member 108, and top plate member 109 each have a flat plate shape.

Front plate member 101 is greater in thickness than bottom plate member 107. Reducing agent tank 40 is mounted on bottom plate member 107 and bottom plate member 107 is a structural material bearing weights of reducing agent tank 40 and reducing agent 90. Therefore, bottom plate member 107 has an appropriate thickness sufficient for ensuring necessary strength in consideration of a weight of reducing agent tank 40. Since front plate member 101 is not a member on which a weight of reducing agent tank 40 is applied in a direction of thickness thereof, it is not necessary to select a thickness in consideration of a weight of reducing agent tank 40. In the present embodiment, however, front plate member 101 is greater in thickness than bottom plate member 107 and front plate member 101 has high rigidity.

Each plate member forming an outer surface of tank case 42 does not have to be formed from one member but may be formed from a plurality of members.

Figure 6:
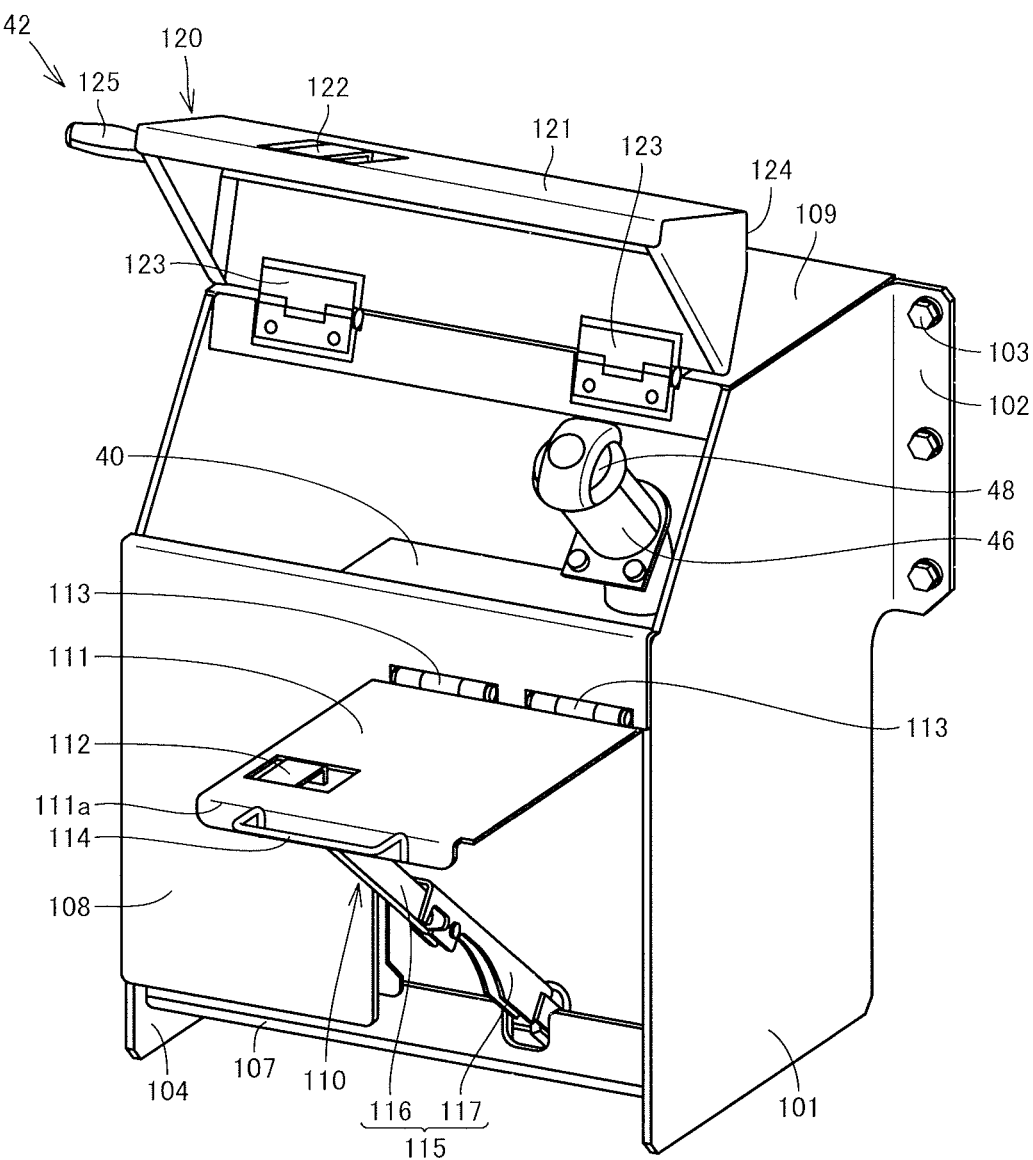
FIG. 6 is a perspective view of the tank case with a cover member and a support base having been moved.

Tank case 42 has a support base 110. Support base 110 is provided to support a container of a reducing agent for replenishment, when reducing agent tank 40 accommodated in tank case 42 is replenished with the reducing agent. A position of support base 110 can be changed between a storage position in which it is stored in tank case 42 and a support position in which it supports a container of the reducing agent with a structure which will be described later. FIG. 5 illustrates support base 110 in the storage position. FIG. 6 illustrates support base 110 in the support position.

Support base 110 has a movable plate member 111, a door handle 112, a pair of hinges 113, and a grip 114. Hinge 113 couples plate member 111 such that the plate member is pivotable relative to side plate member 108. An operator can move plate member 111 around hinge 113 by operating door handle 112 to thereby unlock support base 110 and thereafter lifting the plate member forward by gripping grip 114.

As shown in FIG. 5, while support base 110 is in the storage position, plate member 111 extends as being continuous to side plate member 108 of tank case 42. Plate member 111 and side plate member 108 are arranged substantially flush with each other. Plate member 111 forms a part of the outer surface of tank case 42. An opening is formed in a portion of side plate member 108 where plate member 111 of support base 110 is housed. The opening in side plate member 108 is closed while support base 110 is in the storage position and opened while support base 110 is in the support position.

Tank case 42 has a cover member 120. Cover member 120 has a side portion 121, a door handle 122 provided in side portion 121, a pair of hinges 123, a top portion 124, and a grip 125. Cover member 120 is provided to be pivotable around the pair of hinges 123. Hinge 123 couples top portion 124 of cover member 120 and top plate member 109 to each other such that they are pivotable relative to each other.

Cover member 120 is provided to be opened and closed. FIG. 5 illustrates cover member 120 in a closed state. Reducing agent tank 40 accommodated in tank case 42 is exposed to the outside by opening cover member 120. Reducing agent tank 40 is no longer exposed to the outside as shown in FIG. 5 by closing cover member 120. An operator can move cover member 120 around hinge 123 and expose reducing agent tank 40 to the outside by operating door handle 122 to unlock cover member 120 and thereafter lifting the cover member by gripping grip 125.

While cover member 120 is closed, side portion 121 extends as being continuous to side plate member 108. While cover member 120 is closed, top portion 124 extends as being continuous to top plate member 109. Grip 125 has a substantially cylindrical outer geometry. Grip 125 may be a rotary grip or formed from a rod material.

Figure 7:
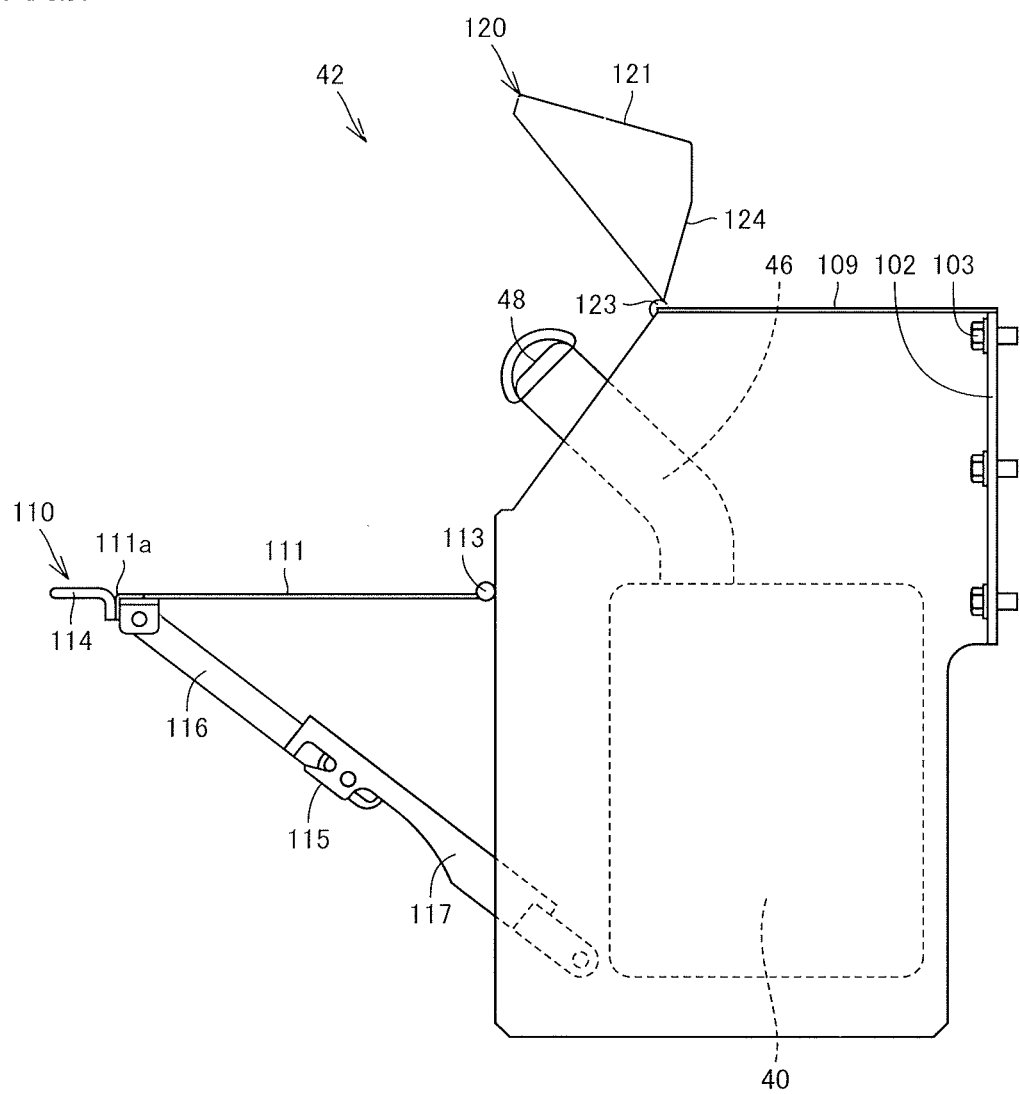
FIG. 7 is a front view of the tank case with the cover member and the support base having been moved.

FIG. 6 is a perspective view of tank case 42 with cover member 120 and support base 110 having been moved. FIG. 7 is a front view of tank case 42 with cover member 120 and support base 110 having been moved. FIGS. 6 and 7 do not illustrate structural components and devices in tank case 42 except for reducing agent tank 40 for the sake of brevity. FIGS. 6 and 7 illustrate support base 110 in the support position. FIGS. 6 and 7 illustrate cover member 120 in the opened state. FIG. 7 illustrates reducing agent tank 40 in tank case 42 with a dashed line.

As shown in FIGS. 6 and 7, support base 110 further has a stay 115. Stay 115 is accommodated in tank case 42 while support base 110 is in the storage position shown in FIG. 5. Stay 115 supports plate member 111 from below while support base 110 is in the support position shown in FIGS. 6 and 7.

Stay 115 has a first stay member 116 and a second stay member 117. First stay member 116 and second stay member 117 each have a shape extending like a rod. First stay member 116 has one end pin-coupled to plate member 111. First stay member 116 has the other end pin-coupled to one end of second stay member 117. Second stay member 117 has the other end pin-coupled around bottom plate member 107 of tank case 42.

First stay member 116 is provided to be pivotable relative to plate member 111, around the pin joining first stay member 116 and plate member 111 to each other. Second stay member 117 is provided to be pivotable around the pin joining second stay member 117 in the internal space in tank case 42.

A long hole is formed in first stay member 116, and a pin penetrating the long hole is fixed to second stay member 117. Thus, first stay member 116 and second stay member 117 are joined to each other to be pivotable relative to each other.

While support base 110 is in the storage position, directions of extension of first stay member 116 and second stay member 117 intersect with each other. Therefore, stay 115 as a whole has a bent shape. While support base 110 is in the support position, directions of extension of first stay member 116 and second stay member 117 match with each other. Therefore, stay 115 as a whole has a linearly extending shape as shown in FIGS. 6 and 7.

Plate member 111 has a substantially rectangular plate shape. Hinge 113 is provided in one side of the rectangular shape. Stay 115 is coupled to a portion of plate member 111 at a distance from hinge 113. A portion at a distance from side plate member 108 of tank case 42 while support base 110 is in the support position is supported by stay 115.

Stay 115 is coupled to plate member 111 in a central portion in the fore/aft direction of plate member 111 in the substantially rectangular shape. An edge portion 111a of plate member 111 at a greatest distance from hinge 113 extends along the fore/aft direction of tank case 42. Edge portion 111a forms a portion of an outer edge of plate member 111, at a greatest distance from side plate member 108 of tank case 42 while support base 110 is in the support position. Stay 115 is coupled around the central portion in a direction of extension of edge portion 111a.

As shown in FIG. 6, by opening cover member 120, reducing agent tank 40 accommodated in tank case 42 is exposed to the outside. Reducing agent tank 40 has a replenishment port 46. A cap 48 is provided at a tip end portion of replenishment port 46. Replenishment port 46 is provided to be opened and closed by attaching or removing cap 48 to and from replenishment port 46.

By opening replenishment port 46 by removing cap 48, reducing agent tank 40 can be replenished with the reducing agent. The tip end portion of replenishment port 46 protrudes from tank case 42 outward by opening cover member 120 as shown in FIG. 7. Thus, a structure is such that replenishment of reducing agent tank 40 with the reducing agent is facilitated.

Figure 8:
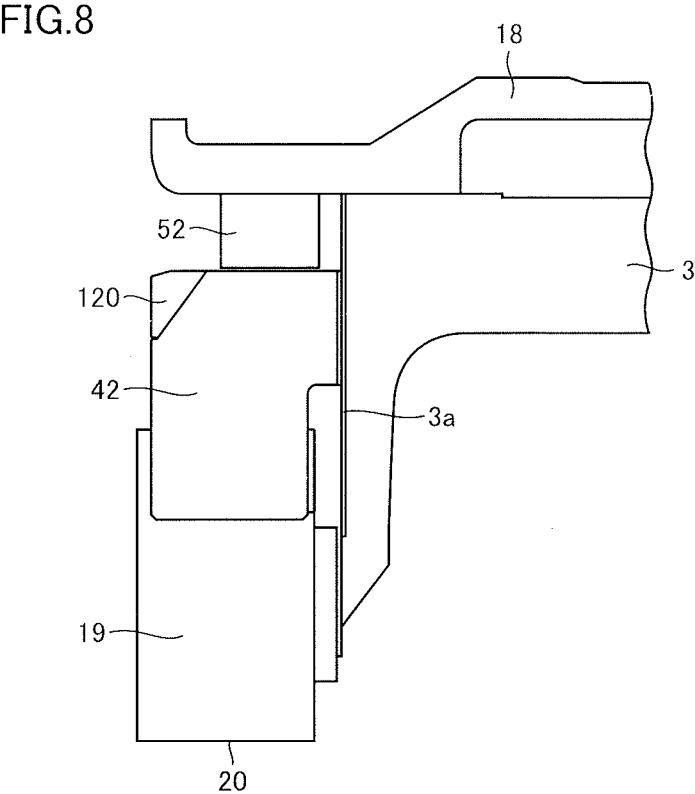
FIG. 8 is a schematic diagram around the reducing agent tank when viewed from the front.

FIG. 8 is a schematic diagram around the reducing agent tank when viewed from the front. As described above, main body frame 3 is attached below engine frame 18. Fixation portion 102 of front plate member 101 and fixation portion 105 of rear plate member 104 described with reference to FIG. 5 are fixed to side plate 3a of main body frame 3 through bolts 103 and 106, respectively. Tank case 42 is arranged with respect to main body frame 3, on the right in the lateral direction of mobile crusher 1 (on the left in FIGS. 8 and 9 in which mobile crusher 1 is viewed from the front). Tank case 42 is arranged at a position closer to a side edge in the lateral direction of mobile crusher 1, than side plate 3a of main body frame 3.

As shown in FIG. 8, tank case 42 in which reducing agent tank 40 is accommodated is attached to side plate 3a of main body frame 3 and supported by main body frame 3. Tank case 42 has cover member 120. Cover member 120 is provided to be able to open and close tank case 42. Reducing agent tank 40 accommodated in tank case 42 is exposed to the outside by opening cover member 120.

Tank case 42 is superimposed on one of the pair of carriers 2 when viewed in the longitudinal direction of the vehicular body frame. Tank case 42 is arranged as being superimposed on crawler belt 19 in the front view. A bottom surface of tank case 42 is arranged at a position lower than an upper surface of crawler belt 19 in the vertical direction.

Pump case 52 in which the reducing agent pump is accommodated is supported by engine frame 18. Pump case 52 is fixed to a lower surface of engine frame 18. Pump case 52 is arranged as being suspended from engine frame 18. A lower surface of pump case 52 and an upper surface of tank case 42 are opposed to each other with a small gap lying therebetween, and arranged substantially in parallel to each other. The internal space in pump case 52 and the tank accommodation space in tank case 42 are formed as spaces separate from each other.

Figure 9:
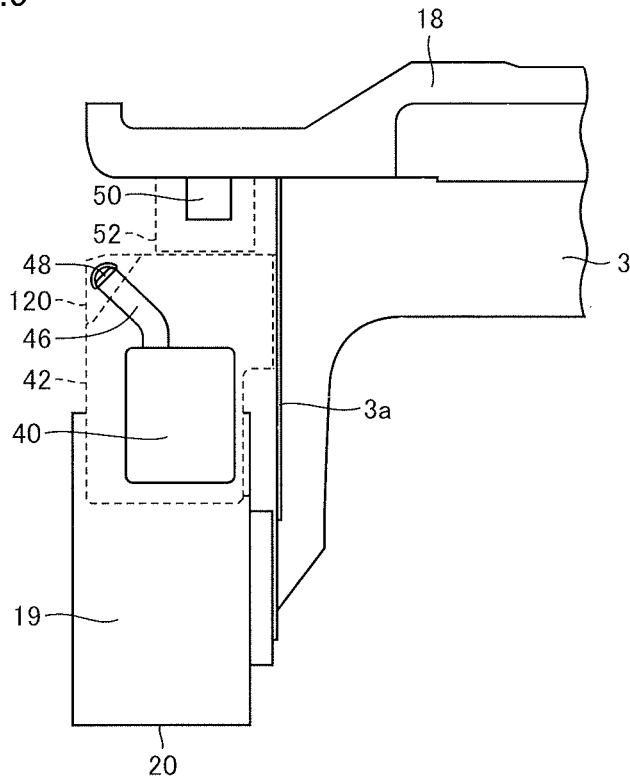
FIG. 9 is a perspective view of the tank case and a pump case shown in FIG. 8.

FIG. 9 is a perspective view of tank case 42 and pump case 52 shown in FIG. 8. FIG. 9 shows tank case 42 and pump case 52 with a dashed line. FIG. 9 illustrates reducing agent tank 40 accommodated in tank case 42 and reducing agent pump 50 accommodated in pump case 52 with a solid line.

As shown in FIG. 9, reducing agent tank 40 is mounted on tank case 42. Reducing agent tank 40 is supported by side plate 3a of main body frame 3 with tank case 42 being interposed.

Reducing agent pump 50 transferring the reducing agent is supported by engine frame 18. Reducing agent pump 50 is fixed to the lower surface of engine frame 18. Reducing agent pump 50 is arranged as being suspended from engine frame 18. The reducing agent pump is provided under engine frame 18 and above reducing agent tank 40. Reducing agent pump 50 is arranged between engine frame 18 and reducing agent tank 40 in the vertical direction.

As reducing agent tank 40 is arranged with reducing agent pump 50 being interposed between reducing agent tank 40 and engine frame 18, reducing agent tank 40 is arranged below engine frame 18 at a distance therefrom. Reducing agent tank 40 is arranged at a position closer to the ground than engine frame 18. Reducing agent tank 40 is arranged at a position closer to ground engaging surface 20 of crawler belt 19. As reducing agent tank 40 is thus arranged, as shown in FIG. 9, reducing agent tank 40 is arranged as being superimposed on crawler belt 19 in the front view. A bottom surface of reducing agent tank 40 is arranged at a position lower than the upper surface of crawler belt 19 in the vertical direction.

Figure 10:
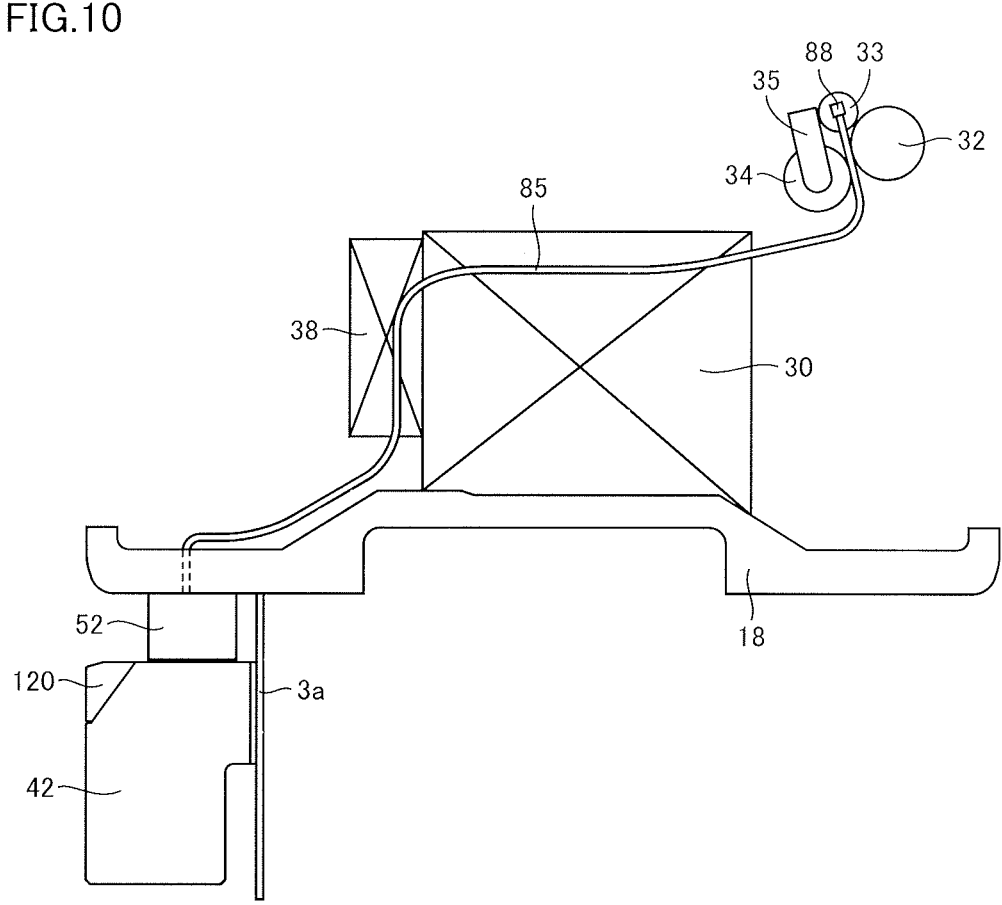
FIG. 10 is a schematic diagram showing a path of piping for the reducing agent.

FIG. 10 is a schematic diagram showing a path of piping for the reducing agent. FIG. 10 shows a diagram in which engine frame 18, engine 30 mounted on engine frame 18, and reducing agent tank 40 (tank case 42) supported by side plate 3a of main body frame 3 are viewed from the front of mobile crusher 1.

Engine 30 serving as the motive power source for driving carrier 2 and crushing apparatus 5 shown in FIG. 1 is mounted on engine frame 18. Engine compartment 6 (FIGS. 1 and 2) accommodating engine 30 is provided in a front portion of engine frame 18. A fan 38 is provided on the right of engine 30 in engine compartment 6 (on the left in FIG. 10 when viewed from the front of mobile crusher 1). Fan 38 is rotationally driven by engine 30 to thereby generate a flow of air which passes through engine compartment 6. Fan 38 generates a flow of air from the right to the left of mobile crusher 1. Engine 30 is arranged on the left of fan 38 which is a downstream side in the flow of air generated by fan 38.

The exhaust gas treatment unit is provided in engine compartment 6. The exhaust gas treatment unit is arranged on the left (on the right in FIG. 10) in the lateral direction of mobile crusher 1, relative to engine 30. A not-shown hydraulic pump driven by engine 30 and transferring a hydraulic oil is directly coupled to engine 30. The hydraulic pump is arranged on the left of engine 30 and the exhaust gas treatment unit is arranged above the hydraulic pump at a distance therefrom. The exhaust gas treatment unit is arranged above engine frame 18 and the hydraulic pump is arranged below the exhaust gas treatment unit.

Delivery pipe 85 couples reducing agent pump 50 and injection nozzle 88 to each other. The reducing agent from reducing agent pump 50 to injection nozzle 88 flows through delivery pipe 85. Delivery pipe 85 extends in the lateral direction from reducing agent pump 50 arranged on the right in the lateral direction of mobile crusher 1 to injection nozzle 88 arranged on the led.

A pump head of reducing agent pump 50 is set so as to be able to transfer the reducing agent from a position of strainer 86 (see FIG. 4) at the tip end of suction pipe 84 provided in reducing agent tank 40 to a position of injection nozzle 88. Delivery pipe 85 is arranged such that an end portion coupled to reducing agent pump 50 is located at a position lowest in the vertical direction and an end portion coupled to injection nozzle 88 is located at a position highest in the vertical direction. Delivery pipe 85 is arranged such that the reducing agent reaching injection nozzle 88 flows upward. With this arrangement of delivery pipe 85, while reducing agent pump 50 remains stopped, the reducing agent moves downward as a result of action of gravity and moves away from injection nozzle 88. Therefore, clogging of injection nozzle 88 by the reducing agent which remains in injection nozzle 88 is avoided.

Figure 11:
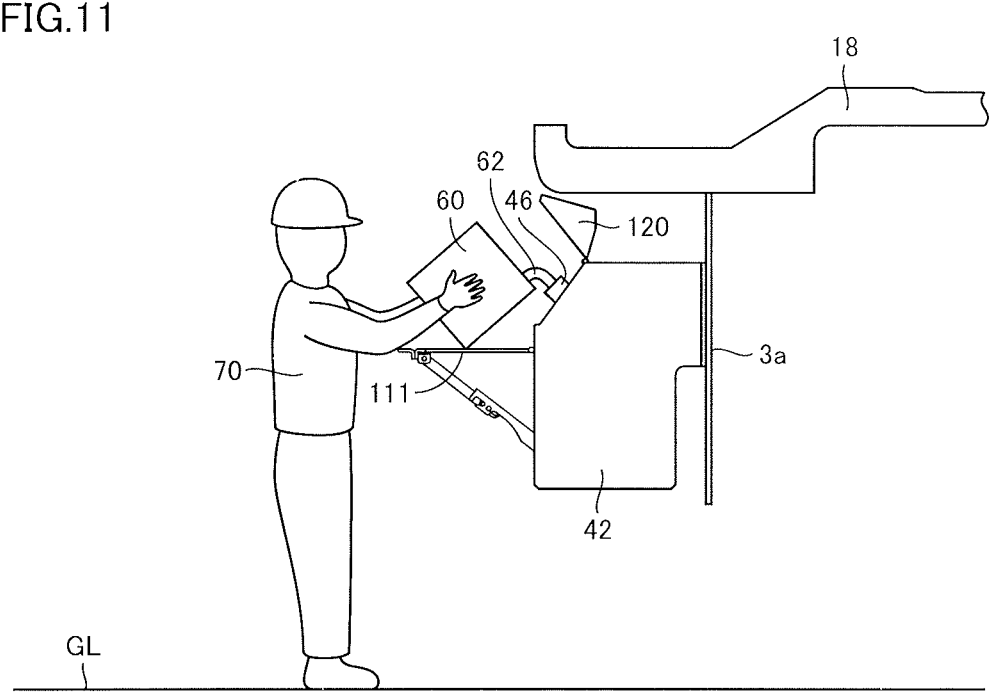
FIG. 11 is a schematic diagram showing an operation for replenishing the reducing agent tank with the reducing agent.

FIG. 11 is a schematic diagram showing an operation for replenishing reducing agent tank 40 with reducing agent 90. Tank case 42 shown in FIG. 11 is in an open state with cover member 120 shown in FIGS. 5 to 7 having been opened, and the tip end portion of replenishment port 46 of reducing agent tank 40 protrudes outward.

An operator 70 replenishes reducing agent tank 40 with the reducing agent by holding with his/her hands, a container 60 accommodating the reducing agent for replenishment and inserting a nozzle 62 into replenishment port 46 and allowing the reducing agent to flow into reducing agent tank 40. Container 60 may be such a bag-in-box that a container made of polyethylene is further covered with a corrugated cardboard. Since reducing agent tank 40 is arranged below engine frame 18 at a distance therefrom and reducing agent tank 40 is arranged at a position closer to a ground surface GL, an operation for replenishing reducing agent tank 40 with the reducing agent is allowed while operator 70 stands on ground surface GL.

During an operation for replenishment with reducing agent 90, support base 110 of tank case 42 is held as being moved to the support position. Plate member 111 of support base 110 is arranged in parallel to ground surface GL and container 60 is carried on plate member 111. Operator 70 places container 60 on support base 110 and performs an operation for replenishing reducing agent tank 40 with reducing agent 90 by obliquely inclining container 60 while support base 110 supports container 60.

A function and effect of the present embodiment will now be described.

As shown in FIGS. 8 to 10, mobile crusher 1 in the present embodiment includes exhaust gas treatment device 34 treating an exhaust gas from engine 30 through reduction reaction, reducing agent tank 40 storing reducing agent 90 supplied to exhaust gas treatment device 34, and tank case 42 accommodating reducing agent tank 40.

Reducing agent tank 40 is arranged below engine frame 18 at a distance therefrom, reducing agent tank 40 is superimposed on crawler belt 19 in the front view, and the bottom surface of reducing agent tank 40 is arranged below the upper surface of crawler belt 19. By thus defining arrangement of reducing agent tank 40 in the vertical direction and arranging reducing agent tank 40 at a position closer to the ground, reducing agent tank 40 is arranged at a position closer to an operator who stands on the ground. Therefore, as shown in FIG. 11, the operator can readily replenish reducing agent tank 40 with the reducing agent while he/she stands on the ground.

Depending of a volume of container 60, a weight of container 60 may exceed 20 kg. It is difficult for operator 70 to continue holding with his/hands, large-weight container 60 during an operation for replenishment with reducing agent 90. Therefore, as shown in FIG. 11, tank case 42 in the present embodiment has support base 110 supporting container 60 of the reducing agent for replenishment to reducing agent tank 40. Thus, operator 70 can readily perform an operation for replenishment with the reducing agent while container 60 is carried on support base 110.

As shown in FIGS. 5 and 6, a position of support base 110 can be changed between the storage position in which it is stored in tank case 42 and the support position in which it supports container 60. Thus, operability can be improved by setting support base 110 to the support position in performing an operation for replenishment with reducing agent 90, and a space occupied by tank case 42 can be saved by storing support base 110 when an operation for replenishment is not performed and support base 110 is not used.

As shown in FIG. 6, support base 110 has pivotable plate member 111 on which container 60 is carried in the support position and stay 115 supporting plate member 111. By doing so, since strength of support base 110 can be improved, container 60 can be supported on support base 110 in a stable manner.

As shown in FIG. 5, plate member 111 forms a part of the outer surface of tank case 42. Since side plate member 108 and plate member 111 are substantially flush with each other when support base 110 is in the storage position, design of tank case 42 can be improved.

As shown in FIG. 6, stay 115 is coupled to plate member 111 in the central portion of plate member 111 in the fore/aft direction. By doing so, plate member 111 can be supported in a more stable manner with the use of one stay 115.

Tank case 42 has front plate member 101 forming the front surface of tank case 42 and bottom plate member 107 forming the bottom surface of tank case 42, and front plate member 101 is greater in thickness than bottom plate member 107.

Mobile crusher 1 may be self-propelled at an operation site where crush objects such as construction debris or natural stones are scattered on the ground. When tank case 42 collides with the crush objects accumulated on the ground surface, reducing agent tank 40 in tank case 42 may deform if front plate member 101 is insufficient in strength. By allowing front plate member 101 to be greater in thickness than bottom plate member 107 so as to enhance strength of front plate member 101, deformation of reducing agent tank 40 can be suppressed even though tank case 42 comes in contact with crush objects when mobile crusher 1 is self-propelled.

In addition to front plate member 101, rear plate member 104 may be greater in thickness than bottom plate member 107. For example, front plate member 101 and rear plate member 104 may be equal to each other in thickness. Though it is sufficient to define a thickness of front plate member 101 alone for the purpose of suppression of deformation of reducing agent tank 40, balance of tank case 42 can be improved by making rear plate member 104 greater in thickness than bottom plate member 107 in addition to front plate member 101.

Though the embodiment of the present invention has been described above, it should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is particularly advantageously applicable to a mobile recycler including an exhaust gas treatment device treating an exhaust gas from an engine through reduction reaction, such as a mobile crusher, a mobile wood grinder, and a mobile soil recycler.

REFERENCE SIGNS LIST 1 mobile crusher; 2 carrier; 3 main body frame; 3a side plate; 3f, 19f, 20f front end; 4 crush object feeding apparatus; 5 crushing apparatus; 6 engine compartment; 7 discharge conveyor; 8 control panel; 18 engine frame; 19 crawler belt; 20 ground engaging surface; 26 tool box; 30 engine; 31 exhaust pipe; 32, 34 exhaust gas treatment device; 33 intermediate connection pipe; 35 exhaust stack; 38 fan; 40 reducing agent tank; 42 tank case; 46 replenishment port; 48 cap; 50 reducing agent pump; 52 pump case; 60 container; 62 nozzle; 70 operator; 81 supply pipe; 83 return pipe; 84 suction pipe; 85 delivery pipe; 86 strainer; 88 injection nozzle; 90 reducing agent; 101 front plate member; 102, 105 fixation portion; 103, 106 bolt; 104 rear plate member; 107 bottom plate member; 108 side plate member; 109 top plate member; 110 support base; 111 plate member; 111a edge portion; 112, 122 door handle; 113, 123 hinge; 114, 125 grip; 115 stay; 116 first stay member; 117 second stay member; 120 cover member; 121 side portion; 124 top portion; and GL ground surface.

The invention claimed is:

1. A mobile recycler, comprising:
a vehicular body frame having a longitudinal direction and a direction of short side in a plan view;
an engine mounted on said vehicular body frame;
a pair of carriers supported on said vehicular body frame at opposing end portions in said direction of short side of said vehicular body frame and extending along said longitudinal direction;
an exhaust gas treatment device treating an exhaust gas from said engine through reduction reaction;
a reducing agent tank storing a reducing agent supplied to said exhaust gas treatment device; and
a tank case accommodating said reducing agent tank, attached to said vehicular body frame, superimposed on one of said pair of carriers when viewed in the longitudinal direction such that a bottom surface of the tank case is arranged at a position lower than an upper surface of the one of said pair of carriers in the vertical direction, and having a support base supporting a container of a reducing agent for replenishment to said reducing agent tank.

2. The mobile recycler according to claim 1, wherein
a position of said support base can be changed between a storage position in which said support base is stored in said tank case and a support position in which said support base supports said container.

3. The mobile recycler according to claim 2, wherein
said support base has a pivotable plate member on which said container is carried in said support position and a stay supporting said plate member.

4. The mobile recycler according to claim 3, wherein
said plate member forms a part of an outer surface of said tank case.

5. The mobile recycler according to claim 3, wherein said stay is coupled to said plate member in a central portion of said plate member its a fore/aft direction.

6. The mobile recycler according to claim 1, wherein said tank case has a front plate member forming a front surface of said tank case and a bottom plate member forming the bottom surface of said tank case, and said front plate member is greater in thickness than said bottom plate member.

\* \* \* \* \*